May 10, 1949.                M. H. SWEET                    2,469,935
                GRAININESS METER HAVING TRANSVERSE AND
                OSCILLATORY MOVEMENT OF THE SPECIMEN
Filed May 17, 1945                                  2 Sheets-Sheet 2
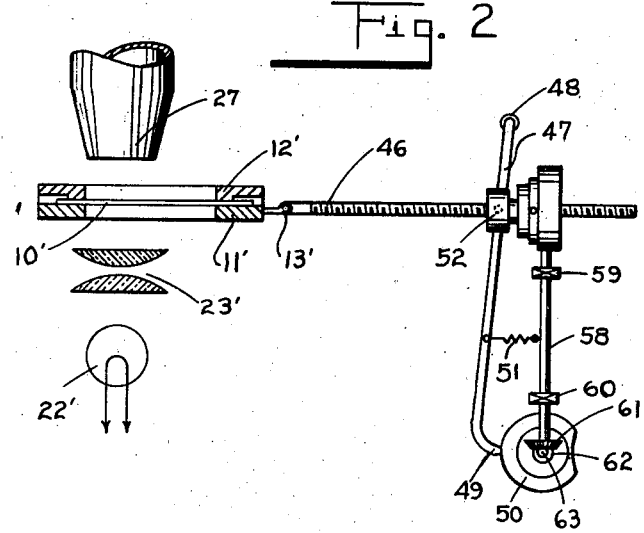
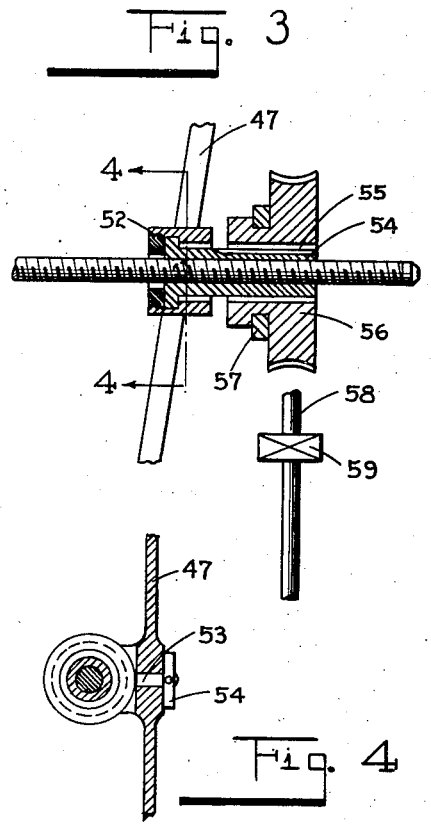
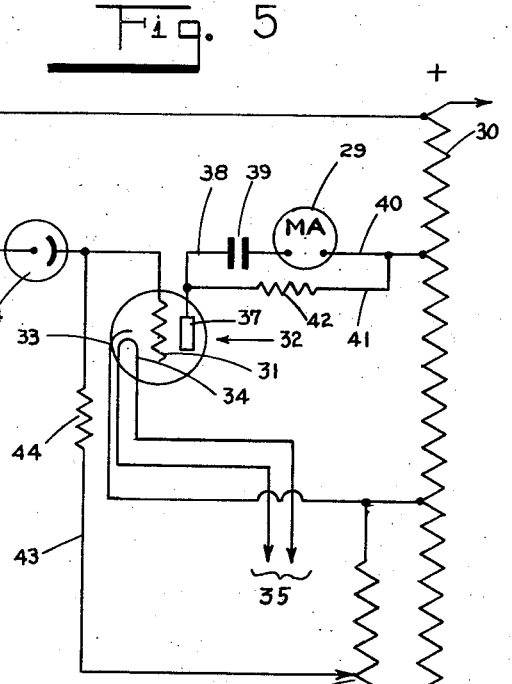
INVENTOR.
MONROE H. SWEET.
BY
ATTORNEYS.

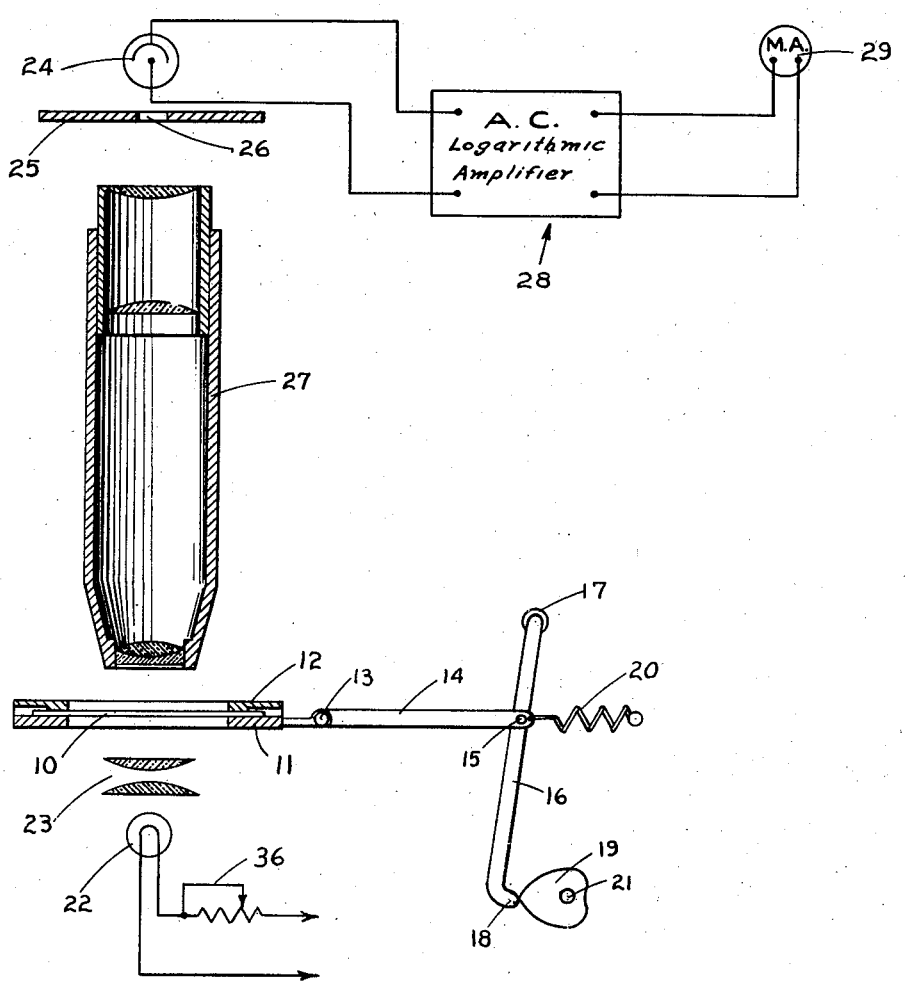

Patented May 10, 1949

2,469,935

UNITED STATES PATENT OFFICE 2,469,935

GRAININESS METER HAVING TRANSVERSE AND OSCILLATORY MOVEMENT OF THE SPECIMEN

Monroe H. Sweet, Binghamton, N. Y., assignor to General Aniline & Film Corporation, New York, N. Y., a corporation of Delaware Application May 17, 1945, Serial No. 594,250

2 Claims. (Cl. 88—14)

This application pertains to an invention in meters for indicating directly the graininess of exposed and developed photographic film or other similar specimens. Heretofore, graininess of film and the like has been measured in various ways, but there has been no instrument devised by means of which a quantitative indication of graininess could be shown directly on an indicator. According to certain methods of the prior art, a record is made on film of fluctuations in transmission of a microscopic area of the specimen; the record is placed in an integrator whereupon graininess may be determined by interpretation of the record. That method is tedious, and insufficiently accurate for most purposes. It is also slow and therefore ill adapted to use as a routine laboratory check.

It is an object of the invention herein described to provide a device in which a transparency, either positive or negative photographic film, or other similar specimen, may be inserted and by means of certain optical, mechanical and electronic devices, an objective test made of the graininess of that specimen and the quantitative value thereof directly indicated on a meter. It is also an object of the invention to devise a simple mechanism for the purpose which may be relatively cheaply constructed and which shall be dependable in operation, have stability of circuit, and therefore give an accurate reading of graininess over a wide range and for an extended period of time.

The invention is hereinafter described by reference to preferred embodiments of the same. According to the invention, the instrument functions to indicate or compare the ratio between the density of the specimen during animation to its density when it is not animated. That ratio is indicated as a measure of the graininess of the specimen. The mechanism embodies a holder for the film or other specimen, mechanical means for animating the holder and therefore the film, and an optical system by which a spot on the film is illuminated and by which that illuminated spot is magnified and the light from the spot absorbed by a vacuum phototube. The animation of the specimen causes the lighted spot to traverse a short distance to and fro along the film, thereby bringing into the field of the magnifier and the light beam a continuously changing area of the specimen so that the phototube is affected by light from the source as modified by the continuously changing area through which that light must pass before being absorbed by the phototube.

The current of the vacuum phototube is amplified by electronic means including, for example, a thermionic tube, preferably of such type as to amplify the current from the phototube according to a logarithmic function thereof. An alternating current milliammeter is employed for measuring that amplified current. Actually the fluctuation of the current as affected by the changing density of the lighted area of the specimen is measured. It is the alternating component of the current which flows when the specimen is animated which is compared to what would flow from the tube in the event the specimen were held stationary or a perfectly homogeneous specimen of like density were either held stationary or animated.

In the event that the graininess of a specimen in which density is not the same throughout the entire specimen is to be indicated, or allowance for selection of a non-representative area made, the holder for the specimen is progressed throughout an extended range in addition to the animation above-mentioned. In that way, an average, or maximum and minimum values of graininess of a subject specimen may be determined.

Now referring to the figures of drawing in which like parts are indicated by like reference numerals:

Fig. 1 is a diagrammatic view of the invention wherein the specimen is animated, but not given any additional movement.

Fig. 2 is a view similar to Fig. 1, but leaving out details of the magnifier and circuit and wherein the specimen is animated and is also slowly progressed throughout an extended range.

Fig. 3 is a section taken vertically through a longitudinal center line of Fig. 2 and showing details of the means for progressing the specimen in addition to animating it.

Fig. 4 is a section taken at line 4—4, Fig. 3.

Fig. 5 is a diagrammatic view showing one circuit which may be employed.

In Fig. 1, a specimen, such as an exposed and developed film 10, is clamped within a holder comprising a base 11 and a cover 12, these being held within guideways (not shown) and within which the holder may be reciprocated. The holder extends outwardly to a hinge 13 to which is connected a link 14 attached at its opposite end to a pivot 15 intermediate the length of a lever 16 capable of being swung about a fixed center 17 at its upper end. That lever 16 has a toe 18 at its lower end engageable with a cam 19 by which it is moved in one direction, a spring 20 providing for return movement in the opposite direction. It has been found that the specimen should be animated by moving it to and fro at about 500 cycles per minute, for the particular dimensions of the model herein described. It is the linear velocity of the specimen which is of importance to the frequency response characteristics of the electronic system. Accordingly, the cam 19 is rotated by shaft 21 which is driven approximately at that speed by some suitable source of power, for example, an electric motor. The design of cam 19 is preferably such that the specimen is animated by moving it through about three millimeters to a centimeter of travel and at a relatively uniform rate. Preferably the cam should give to the holder rapid acceleration and deceleration with a more or less uniform rate of travel intermediate the ends of its reciprocatory movement. Of course, other means for imparting the animation will be suggested to those skilled in the art, and that herein illustrated and described is given by way of example only.

The specimen is irradiated by an incandescent lamp, or other suitable source of illumination 22, the rays from which pass through a condenser 23 which may take the form shown or may merely be a simple convergent lens adapted to concentrate light upon the specimen. An adjustable resistance 36 allows regulation of the light source 22.

A magnifying means is so positioned on the receiver side of the specimen that the illuminated area thereof is greatly magnified before that light is absorbed by the phototube. Such a phototube 24 is positioned in line with the light 22, condenser 23, and a baffle 25 having therein an aperture 26 by which the lighted area is confined to a small diameter. A magnifier 27 herein shown is a simple mocroscope, but it may take any convenient form so long as the specimen is suitably enlarged and resolved to be imaged at the phototube 24 through the aperture 26.

The phototube 24 is connected electrically to an alternating current amplifier, generally indicated by numeral 28, and which is adapted logarithmically to amplify current flowing from the cathode of the phototube to the grid of a thermionic tube in the amplifier circuit. The amplified current from the tube is indicated by a milliammeter 29 of such type as to show the value of the alternating current component, but is graduated in terms of graininess rather than in electrical units. While the meter may be calibrated in any system by which graininess may be measured, it is preferred to use units for quantitatively measuring that function, such as have been suggested by Professor Goetz, since there is no universal standard at this time.

Now referring to Fig. 5, a circuit diagram is illustrated such as might be employed for amplifying and for measuring the alternating current, thereby indicating graininess. If the specimen 10 were not animated, or if it were absolutely homogeneous and were animated, the light falling upon the tube 24 would not vary in any significant amount, and thereby the current flowing from the light sensitive tube would be constant. Assuming it to be a direct current, since the amplifier 28 is an alternating current amplifier, there would be no amplification of current indicated by meter 29, Fig. 1. In setting the meter, that is, in making a zero adjustment, this fact is employed so that the scale on which graininess is to be read would indicate a perfectly homogeneous specimen when no alternating current impulse is set up in the circuit. That is, a specimen being animated, but perfectly grainless, would affect the meter in the same way as a specimen having a finite graininess, providing that latter specimen were held stationary.

The phototube 24 is preferably an RCA 929 tube of the Sb-Cs coated type. That is not the only tube possible of use, and in fact, any tube having the desired response to the light source employed, and having a linear response may be used in place of that just mentioned. The anode of tube 24 is connected to the positive end of a resistance 30 from which current is drawn, and of course, to which current is supplied from any suitable source, such as a supply line, battery, or rectified source of current from a supply. The cathode of the tube is connected to the grid 31 of a triode, generally indicated by numeral 32. That triode is of type 6F5, but others may be employed and that particular type tube is cited only by way of example. The tube 31 has a cathode 33 which also connects to the supply at resistance 30. The tube filament 34 is supplied with current from a line 35. Tube 32 also has a plate 37, that being connected through a milliammeter 29 to the current supply 30. The plate circuit includes a conductor 38 connected through condenser 39 to one side of the milliammeter 29 and a conductor 40 from the other side of that meter to resistance 30. The meter and condenser are also shunted by a resistance 42. The milliammeter is adapted to measure the alternating current component of the plate circuit, and by way of example, rectifier type-D'Arsonval instruments may be used. Grid resistor 44 derives its bias voltage from potentiometer 45. Its purpose is to create circuit conditions such that the relationship between log (grid current) and plate current will be linear at low grid current values.

While it is possible to employ a circuit in which the amplification of the current is not logarithmic, the latter is preferred. If the amplification is logarithmic, then the scale or graduations on the meter may be uniformly spaced in terms of uniform changes in graininess. Otherwise, those graduations will be spaced in accordance with characteristics of the amplifying circuit.

The light flux which excites the phototube 24 varies with the density of the specimen. The graininess of the specimen is measured without having to resort to compensation for the total density of the specimen. As before stated, it is only the pulsating direct current that affects the milliammeter. In fact, the measurement of graininess may be defined as the ratio between density of the specimen, or a predetermined area thereof, during animation, as compared to that density when not animated. For this reason, it is preferable that a logarithmic relationship between the plate current and the grid current of the triode be maintained.

While a non-logarithmic circuit may be employed and with it a consequent non-uniformly graduated scale on the current measuring instrument, that is usually not as desirable as the preferred form which constitutes the major part of this disclosure.

With a logarithmic circuit the density level of the specimen does not matter. It is the flux ratio which is being measured and indicated and that is a unique function of the logarithmic circuit. Then density level may vary in the specimen, or in comparative specimens, the total light may vary over a period of time as by drifting, or the response of the various electronic elements of the circuit may vary over a period of time, yet the accuracy of the instrument remains unaffected.

*Operation*

In practice, a specimen, such as a photographic negative 10, is inserted in the holder and the source of illumination 22 is energized. Assuming that the circuit has been properly adjusted, and that the meter 29 indicates zero, or lack of grain when the specimen is stationary, the cam 19 is caused to rotate, thereby imparting reciprocation to the holder 11 so that the specimen is animated with respect to the light beam concentrated thereon by condenser 23. That light beam illuminates a spot on the negative which is then greatly magnified, and the light flux from a small area of which passes through aperture 26 to fall upon the phototube 24. If the specimen has no graininess whatsoever, current flowing from the phototube to the grid 31 of tube 32 would assume some particular positive value and would remain at that value. Since it is a constant current, there would be no fluctuation or pulsation therein, and the alternating current amplifier would not be affected by the current in any way. Accordingly, the meter would correctly indicate lack of graininess in the specimen. Of course, all developed photographic emulsions have finite grain, and generally the metallic silver grains are of appreciable size and also tend to concentrate in clusters, that being the most frequent and troublesome form of graininess. When such a specimen is animated across the light beam, the lack of homogeneity in the successively illuminated areas through which the beam is projected during the cycle, gives rise to a fluctuating quantity of light falling upon the tube 24. That causes a corresponding fluctuation in the current from the tube 24 to the grid 31 of the tube 32. The amplitude of this current pulsation varies linearly since the characteristics of the phototube are selected with that qualification in mind.

While the output of the phototube 24 is affected by the total density of the specimen and that output, in turn, affects the grid 31 of the tube 32, the amplifier and the meter circuit are such that the A. C. component only is both amplified and measured. The fluctuating plate current controlled by the alternating component in the direct current from tube 24, causes the meter 29 to indicate the magnitude or amplitude of that alternating component. That is a measure of the graininess of the specimen.

The graduation of the scale is dependent to some extent on the magnification of the microscope 27, but in any event is so made in accordance with that system employed as to show accurately the comparative graininess of the specimen within that range necessary for the usual photographic emulsions. It may be desirable for certain purposes to graduate the instrument in such a way that it can be used for relatively coarse grained emulsions by employing one scale, and so as to bring into the circuit an increased sensitivity for extending it to emulsions which are relatively fine grained.

*Modification*

Now referring to Figs. 2, 3 and 4, a modification is shown in which, in addition to the animation of the specimen, it is also progressed across the light beam, thereby to make possible a more representative indication of graininess in the event the particular area selected, as in Fig. 1, should not be a representative area. This modification also may be more suitable for use with developed images varying greatly in density throughout most of the total area. In Fig. 2, only so much of the basic instrument is shown as is necessary for illustrating the additional mechanism. Elements in this figure similar to those of Fig. 1 are indicated by like numerals having primes.

The holder 11' extends out at one end to terminate in a pivot or hinge 13' to which is connected a threaded rod or stem 46. Then the animation of the specimen and simultaneous progressive movement thereof are brought about by mechanism presently to be described. A lever 47 is pivoted at a fixed point 48 and extends downwardly to a toe 49 engageable with the outer surface of a cam 50 similar to cam 19, Fig. 1. A spring 51 returns the lever to the right after it has been moved in the opposite direction by the cam; it also maintains the toe 49 in engagement with the surface of the cam.

As shown in Figs. 3 and 4, a collar 52, having a projecting stud 53 on which it may pivot in a bearing in lever 47, retains an elongated sleeve 54 threaded internally for the reception of the threaded rod 46. Collar 52 is held in place within the bearing in lever 47 by any suitable retaining means, such as a washer 64 pinned in place on stud 53. As the arm or lever 47 is swung to and fro, collar 52 is moved in a manner similar to pivot 15, Fig. 1. The sleeve 54 is free to rotate within collar 52, but is maintained in axial alignment therewith and receives the same motion as the collar since it terminates at its left-hand end in a flange received within a groove in the collar 52. Sleeve 54 is splined as at 55 for part of its length and on its splines rides a worm wheel 56 retained by a supporting collar 57 which prevents longitudinal or axial movement of the worm wheel. This worm wheel is rotated by a worm (not shown) at the upper end of a shaft 58 rotatable in bearings 59 and 60. At the lower end of that shaft, a bevel gear 61 meshes with a bevel pinion 62 which is in turn fixed on a central shaft 63, similar to the shaft 21, Fig. 1.

Movement of the rod 46, collar 52, and sleeve 54 is confined to not over about one centimeter, and therefore, the angular movement of the lever 47 is extremely slight. While in theory the parts just described have other than a straight line motion, the deviation is so slight as to be practically negligible. Collar 57 is not an especially tight fit radially of the groove within which it engages, and therefore serves only to prevent axial movement of the worm wheel 56. In operation, cam 50 causes oscillation of lever 47, which in turn imparts a corresponding movement to the collar 52 pivoted to the arm. Sleeve 54 moves with collar 52, but due to the working fit between the splines 55 and similar grooves in the hub of the worm wheel, it slides within that hub, thereby making it possible to hold the worm wheel relatively stationary so far as axial movement goes, but to rotate it and thereby drive the sleeve 54 so as slowly to progress or advance the threaded rod 46. Rotation of the shaft 63 is such as to impart the required animation of the specimen and the reduction in gearing allows motion to be derived from that same source for slowly rotating the worm wheel and collar 54 so as to progress the specimen across the light beam at a rate to read graininess progressively over an extended area.

The animation of the specimen, as well as its progression according to the modified form of the invention, have been described as linear. It is to be understood that the specimen may be moved in other manners, for example, it may be given a circular movement, either for animation or progression, or both. In that event, the carrier or holder for the specimen is mounted upon a rotating element which is animated to and fro through the requisite distance and also may be simultaneously progressed so as to measure the value of the graininess over an extended area.

If a rotary progressive motion is employed, the cycle may merely be repeated in the same direction of movement. With linear progression, provision is made for return of the holder to its starting position, or alernately, it may be reversed to repeat, not the same, but a similar, reversed cycle. That makes no difference if the reversal is for a new specimen. One construction for quick return includes either a disconnectable worm or bevel pinion so that the screw may be quickly returned by spinning the worm wheel by hand. Reversible movement under power involves a substitution of a reversible threaded screw and correspondingly threaded sleeve.

In place of the simple vacuum phototube used, it is contemplated that an electron multiplier type of phototube may be substituted in which event a less intense light source is permissible, or greater response and greater accuracy realized. Similarly, the amplification may be by a series of amplifier tubes or by other than the simple triode shown by way of illustration.

In this disclosure, mention has been made of film, either positive or negative, or other specimens of which graininess is a characteristic. In the description and claims, the term "film," "specimen," or "light transmissive layer" is intended to include all non-homogeneous transparent or translucent materials of which a quantitative value of graininess may be desired.

The instrument as described is direct reading, that is, an indication of the desired characteristic for the specimen may be read off the meter at any instant after simply inserting the specimen and animating it. In some events, it may be desired to record the value of graininess for a specimen or series of specimens, especially when employing the invention according to the modification. In that case, a recording type milliammeter is provided and the record thus made may be preserved and, of course, is better adapted to a more detailed study than can be made by mere observation of the indicating milliammeter.

While one embodiment and a modification of the invention have been disclosed, it is to be understood that the inventive concept may be carried out in a number of ways. This application is, therefore, not to be limited to the precise details described, but is intended to cover all variations and modifications thereof, falling within the spirit of the invention and the scope of the claims.

I claim:

1. In an apparatus for determining the graininess of film or other light-transmissive specimen by repeatedly exploring an area thereof, a holder for said specimen between a light source and a light-responsive device, means for oscillating said holder in a plane transverse to the beam of said light source comprising a threaded rod attached to said holder, a lever pivoted at a fixed point, a rotatable cam engaging said lever, and a collar on said rod having a stud journaled in said lever for imparting movement to said rod upon rotation of said cam and means for progressively moving said specimen transverse to said beam while maintaining oscillation thereof comprising means rotatable in said collar and in threaded engagement with said rod and means for rotating said sleeve in unison with the rotation of said cam whereby the area explored is progressively extended over the entire specimen.

2. In an apparatus for determining the graininess of film or other light-transmissive specimen by repeatedly exploring an area thereof, a holder for said specimen between a light source and a light-responsive device, means for moving said holder in a plane transverse to the beam of said light source comprising a pivot for said holder, a threaded rod pivotally supported therein, a lever pivoted at a fixed point having a bent portion, a rotatable cam engaging said portion whereby said lever is caused to oscillate, and a collar on said rod having a stud journaled in said lever for imparing the oscillation to said rod, and means for progressively moving said specimen transverse to said beam while maintaining oscillation thereof comprising a sleeve rotatable in said collar and in threaded engagement with said rod and a drive shaft coupled to said cam and to said sleeve whereby said cam imparts rotation to said sleeve over the thread of said rod and the area explored is progressively extended over the entire specimen.

MONROE H. SWEET.

REFERENCES CITED

The following references are of record in the file of this patent:

UNITED STATES PATENTS

| Number | Name | Date |
| --- | --- | --- |
| 1,640,567 | Firestone | Aug. 30, 1927 |
| 1,991,599 | Davis | Feb. 19, 1935 |

OTHER REFERENCES

"Light-Scattering and the Graininess of Photographic Emulsions," an article by Goetz et al. in Journal of the Society of Motion Picture Engineers for Dec. 1942, pages 375 to 377.

Journal of the Society of Motion Picture Engineers for February 1942, article by M. H. Sweet on pages 148 to 172.